US012462560B2

(12) United States Patent
Sinha et al.

(10) Patent No.: US 12,462,560 B2
(45) Date of Patent: Nov. 4, 2025

(54) VIDEO MANIPULATION DETECTION

(71) Applicant: Adobe Inc., San Jose, CA (US)

(72) Inventors: Ritwik Sinha, Cupertino, CA (US); Viswanathan Swaminathan, Saratoga, CA (US); Trisha Mittal, College Park, MD (US); John Philip Collomosse, Pyrford (GB)

(73) Assignee: Adobe Inc., San Jose, CA (US)

( * ) Notice: Subject to any disclaimer, the term of this patent is extended or adjusted under 35 U.S.C. 154(b) by 600 days.

(21) Appl. No.: 17/845,353

(22) Filed: Jun. 21, 2022

(65) Prior Publication Data
US 2023/0410505 A1 Dec. 21, 2023

(51) Int. Cl.
*G06V 10/00* (2022.01)
*G06T 7/00* (2017.01)
*G06V 10/82* (2022.01)
*G06V 20/40* (2022.01)
*G06V 40/18* (2022.01)

(52) U.S. Cl.
CPC ............ *G06V 20/41* (2022.01); *G06T 7/0002* (2013.01); *G06V 20/44* (2022.01)

(58) Field of Classification Search
CPC ...... G06T 7/0002; G06V 40/18; G06V 10/82; G06V 20/41; G06V 20/44; G06V 10/00
See application file for complete search history.

(56) References Cited

U.S. PATENT DOCUMENTS

| 10,546,193 | B2* | 1/2020 | Schmidt | G06Q 10/063114 |
| 2020/0134295 | A1* | 4/2020 | el Kaliouby | G06V 10/82 |
| 2022/0138472 | A1* | 5/2022 | Mittal | G06N 3/045 |
| | | | | 382/181 |
| 2022/0269922 | A1* | 8/2022 | Mathews | G06V 20/46 |

OTHER PUBLICATIONS

Li, Y. "Exposing deepfake videos by detecting face warping artifacts." arXiv preprint arXiv:1811.00656 (2018) (Year: 2018).*
Mehta, Vineet, et al. "Fakebuster: a deepfakes detection tool for video conferencing scenarios." Companion Proceedings of the 26th International Conference on Intelligent User Interfaces. 2021. (Year: 2021).*
Prajapati, Pratikkumar. "Quantifying DeepFake Detection Accuracy for a Variety of Natural Settings." (2020) (Year: 2020).*
(Continued)

*Primary Examiner* — Andrew M Moyer
*Assistant Examiner* — Dylan John Mendez Muniz
(74) *Attorney, Agent, or Firm* — FIG. 1 Patents

(57) ABSTRACT

Techniques for video manipulation detection are described to detect one or more manipulations present in digital content such as a digital video. A detection system, for instance, receives a frame of a digital video that depicts at least one entity. Coordinates of the frame that correspond to a gaze location of the entity are determined, and the detection system determines whether the coordinates correspond to a portion of an object depicted in the frame to calculate a gaze confidence score. A manipulation score is generated that indicates whether the digital video has been manipulated based on the gaze confidence score. In some examples, the manipulation score is based on at least one additional confidence score.

20 Claims, 10 Drawing Sheets

(56) References Cited

OTHER PUBLICATIONS

Li, Xiaodan, et al. "Sharp multiple instance learning for deepfake video detection." Proceedings of the 28th ACM international conference on multimedia. 2020. (Year: 2020).*

Ciftci, Umur Aybars, Ilke Demir, and Lijun Yin. "Fakecatcher: Detection of synthetic portrait videos using biological signals." IEEE transactions on pattern analysis and machine intelligence (2020 (Year: 2020).*

Demir, Ilke, and Umur Aybars Ciftci. "Where do deep fakes look? synthetic face detection via gaze tracking." ACM symposium on eye tracking research and applications. 2021. (Year: 2021).*

Mantiuk, Radoslaw, Bartosz Bazyluk, and Rafal K. Mantiuk. "Gaze-driven object tracking for real time rendering." Computer Graphics Forum. vol. 32. No. 2pt2. Oxford, UK: Blackwell Publishing Ltd, 2013. (Year: 2013).*

Brau, Ernesto, et al. "Multiple-gaze geometry: Inferring novel 3d locations from gazes observed in monocular video." Proceedings of the European Conference on Computer Vision (ECCV). 2018 (Year: 2018).*

"Content Authenticity Initiative", Adobe Inc., [retrieved Mar. 21, 2022]. Retrieved from the Internet <https://contentauthenticity.org/>., 2020, 2 Pages.

Afchar, Darius, et al., "MesoNet: a Compact Facial Video Forgery Detection Network", Cornell University arXiv, arXiv.org [retrieved Mar. 21, 2022]. Retrieved from the Internet <https://arxiv.org/pdf/1809.00888.pdf>., Sep. 4, 2018, 7 Pages.

Dolhansky, Brian, et al., "The Deepfake Detection Challenge (DFDC) Preview Dataset", Cornell University arXiv, arXiv.org [retrieved Mar. 21, 2022]. Retrieved from the Internet <https://arxiv.org/pdf/1910.08854.pdf>., Oct. 23, 2019, 4 Pages.

Dosovitskiy, Alexey, et al., "FlowNet: Learning Optical Flow With Convolutional Networks", IEEE International Conference on Computer Vision [retrieved Mar. 21, 2022]. Retrieved from the Internet <http://citeseerx.ist.psu.edu/viewdoc/download?doi=10.1.1.708.2328&rep=rep1&type=pdf>., Dec. 2015, 9 Pages.

Dufour, Nick, et al., "Contributing Data to Deepfake Detection Research", Google AI Blog [retrieved Mar. 21, 2022]. Retrieved from the Internet <https://ai.googleblog.com/2019/09/contributing-data-to-deepfake-detection.html>., Sep. 24, 2019, 3 Pages.

Jiang, Liming, et al., "DeeperForensics-1.0: A Large-Scale Dataset for Real-World Face Forgery Detection", Cornell University arXiv, arXiv.org [retrieved Mar. 21, 2022]. Retrieved from the Internet <https://arxiv.org/pdf/2001.03024.pdf>., Dec. 11, 2020, 17 Pages.

Kleinsmith, Andrea, et al., "Affective Body Expression Perception and Recognition: A Survey", IEEE Transactions on Affective Computing, vol. 4, No. 1 [retrieved Mar. 21, 2022]. Retrieved from the Internet <http://web4.cs.ucl.ac.uk/uclic/people/n.berthouze/KleinsmithBerthouze12.pdf>., Jun. 2012, 20 pages.

Korshunov, Pavel, et al., "DeepFakes: a New Threat to Face Recognition? Assessment and Detection", Cornell University arXiv, arXiv.org [retrieved Mar. 21, 2022]. Retrieved from the Internet <https://arxiv.org/pdf/1812.08685.pdf>., Dec. 20, 2018, 5 Pages.

Kosti, Ronak, et al., "EMOTIC: Emotions in Context Dataset", IEEE Conference on Computer Vision and Pattern Recognition Workshops [retrieved Mar. 21, 2022]. Retrieved from the Internet <https://openaccess.thecvf.com/content_cvpr_2017_workshops/w41/papers/Lapedriza_EMOTIC_Emotions_in_CVPR_2017_paper.pdf>., Jul. 2017, 9 Pages.

Li, Yuezun, et al., "Celeb-DF: A New Dataset for DeepFake Forensics", Cornell University arXiv, arXiv.org [retrieved Mar. 21, 2022]. Retrieved from the Internet <https://arxiv.org/pdf/1909.12962v2.pdf>., Oct. 2, 2019, 6 Pages.

Li, Yuezun, et al., "Exposing DeepFake Videos by Detecting Face Warping Artifacts", Cornell University arXiv, arXiv.org [retrieved Mar. 21, 2022]. Retrieved from the Internet <https://arxiv.org/pdf/1811.00656.pdf>., May 22, 2019, 7 Pages.

Mittal, Trisha, et al., "EmotiCon: Context-Aware Multimodal Emotion Recognition Using Frege's Principle", Cornell University arXiv, arXiv.org [retrieved Mar. 21, 2022]. Retrieved from the Internet <https://arxiv.org/pdf/2003.06692.pdf>., Mar. 14, 2020, 12 Pages.

Mittal, Trisha, et al., "Emotions Don't Lie: An Audio-Visual Deepfake Detection Method using Affective Cues", Proceedings of the 28th ACM International Conference on Multimedia [retrieved Mar. 21, 2022]. Retrieved from the Internet <https://arxiv.org/pdf/2003.06711.pdf>., Aug. 1, 2020, 10 pages.

Nguyen, Huy H, et al., "Capsule-Forensics: Using Capsule Networks to Detect Forged Images and Videos", Cornell University arXiv, arXiv.org [retrieved Mar. 21, 2022]. Retrieved from the Internet <https://arxiv.org/pdf/1810.11215.pdf>., Oct. 26, 2018, 5 Pages.

Nguyen, Huy H, et al., "Multi-task Learning for Detecting and Segmenting Manipulated Facial Images and Videos", Cornell University arXiv, arXiv.org [retrieved Mar. 21, 2022]. Retrieved from the Internet <https://arxiv.org/pdf/1906.06876.pdf>., Jun. 17, 2019, 8 Pages.

Recasens, ADRIà, et al., "Where are they looking?", PHD thesis, Massachusetts Institute of Technology [retrieved Mar. 21, 2022]. Retrieved from the Internet <https://proceedings.neurips.cc/paper/2015/file/ec8956637a99787bd197eacd77acce5e-Paper.pdf>., Dec. 2015, 9 Pages.

Rossler, Andreas, et al., "FaceForensics++: Learning to Detect Manipulated Facial Images", Cornell University arXiv, arXiv.org [retrieved Mar. 21, 2022]. Retrieved from the Internet <http://128.84.21.203/pdf/1901.08971>., Aug. 26, 2019, 14 Pages.

Yang, Xin, et al., "Exposing Deep Fakes Using Inconsistent Head Poses", Cornell University arXiv, arXiv.org [retrieved Mar. 21, 2022]. Retrieved from the Internet <https://arxiv.org/pdf/1811.00661.pdf>., Nov. 13, 2018, 4 Pages.

Zhou, Peng, et al., "Two-Stream Neural Networks for Tampered Face Detection", Cornell University arXiv, arXiv.org [retrieved Mar. 21, 2022]. Retrieved from the Internet <https://arxiv.org/pdf/1803.11276.pdf>., Mar. 29, 2018, 9 Pages.

Zi, Bojia, et al., "WildDeepfake: A Challenging Real-World Dataset for Deepfake Detection", Cornell University arXiv, arXiv.org [retrieved Mar. 21, 2022]. Retrieved from the Internet <http://128.84.4.18/pdf/2101.01456>., Jan. 5, 2021, 9 Pages.

\* cited by examiner

VIDEO MANIPULATION DETECTION

BACKGROUND

With the proliferation of video editing software and increased accessibility of artificial intelligence tools, manipulated digital content has become widely prevalent. While edited videos and images have useful applications, manipulated digital content is intentionally misleading to individuals consuming the content. For instance, tampered digital content is used to deceive audiences, misrepresent individuals, and perpetuate misinformation such as "fake news."

Strategies for generating manipulated content are extensive and evolving. However, conventional methods for detecting manipulations are limited. For instance, manual detection, e.g., by a user, is time consuming and is often unsuccessful at identifying content that has been edited maliciously. Further, conventional software based detection methods are constrained to detecting particular types of alterations, and thus frequently misidentify whether an instance of digital content is misleadingly manipulated or not.

SUMMARY

Techniques and systems for video manipulation detection are described. In one example, a computing device implements a detection system to receive digital content such as a digital video including one or more frames. The detection system is configured to calculate a manipulation score that indicates whether or not the digital video has been manipulated. The manipulation score is based on one or more confidence scores generated using a variety of manipulation detection modalities.

For instance, the manipulation score is based on one or more of a gaze confidence score, a visual artifact confidence score, a temporal confidence score, and/or an affective state confidence score calculated by the detection system. In some examples, the detection system is further operable to determine a type of manipulation, as well as indicate a spatial and/or temporal location of the manipulation within the digital video. Thus, the techniques described herein enable detection of a variety of types of misleading manipulations in digital content with dynamic scenes and complex interactions.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
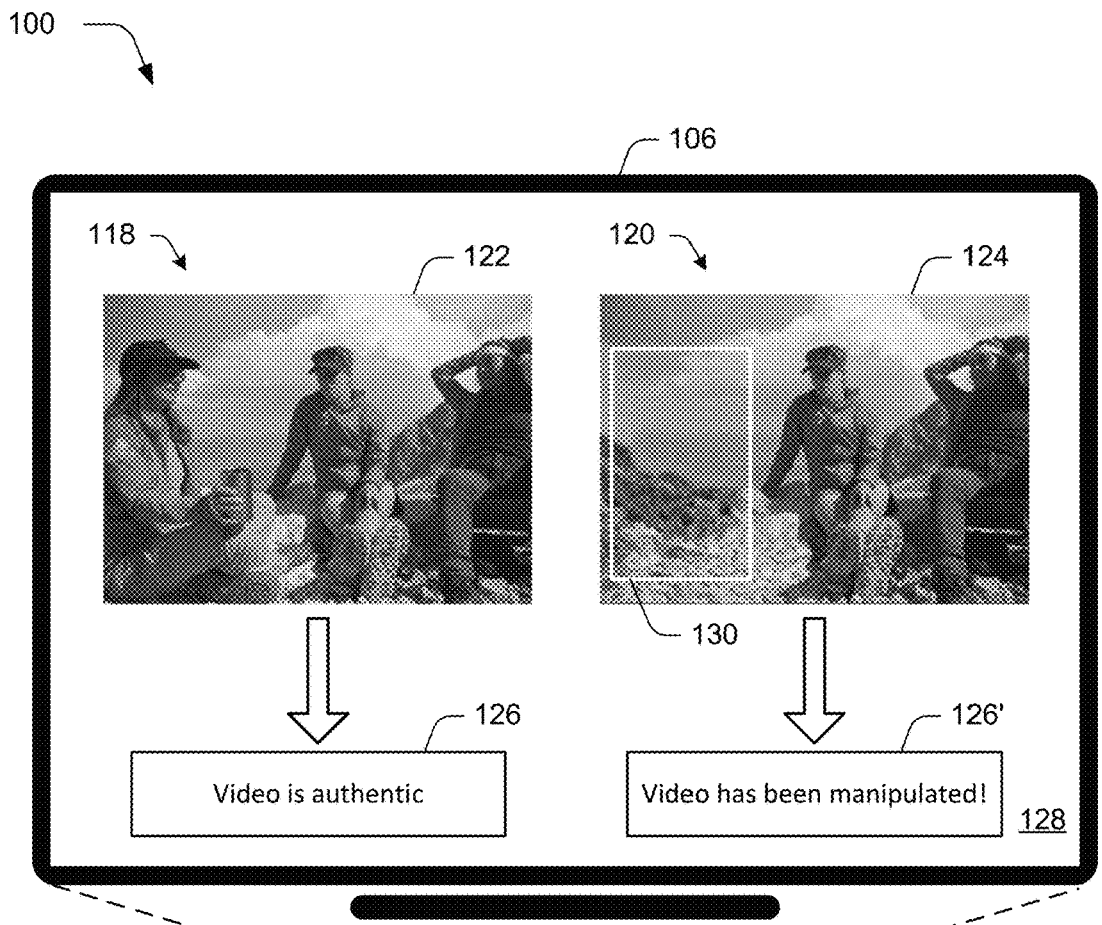
FIG. 1 is an illustration of an environment in an example implementation that is operable to employ video manipulation detection techniques described herein.
Figure 1:
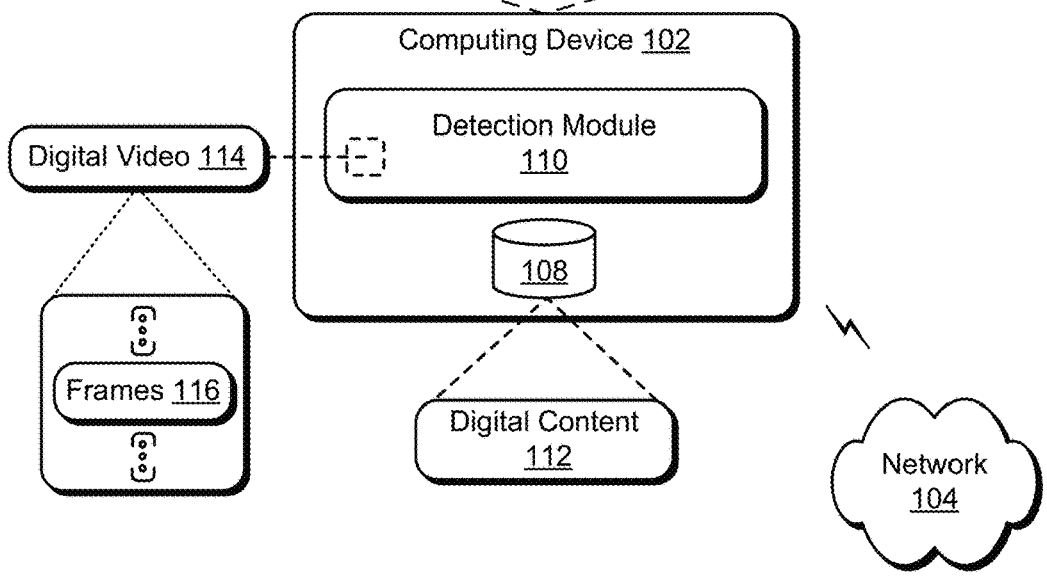

Strategies for maliciously tampering with digital content are expansive and constantly evolving. For instance, these strategies include spatial attacks such as copy-move and splicing (e.g., adding or removing objects from videos), retouching/lighting edits, face swapping, face re-enactment, audio driven face re-enactment, etc. Additionally, video manipulation strategies include temporal alterations such as frame dropping, frame insertions, shifting in time, frame swapping, etc. Geometric edits are also included, such as cropping, resizing, rotations, and/or shifting of one or more digital content features. Thus, there are a wide range of manipulation tactics that enable numerous ways to falsify digital content to spread misleading social, political, and/or commercial information.

Consequently, improved manipulation detection methods are desired to keep pace with the ever-changing landscape of digital content alteration. Some conventional methods utilize deep learning in an attempt to detect deceptive media, e.g., "deep fake" detection models. However, these conventional methods are inherently constrained to detection of the types of manipulations included in training data, i.e., are limited to detecting a single type of malicious edit that "they are looking for." Further, conventional methods are limited to single subject videos and/or do not consider the context of a video, and thus are unable to identify a variety of types of deceptive manipulations in videos with multiple individuals and/or complicated backgrounds.

Accordingly, techniques and systems for video manipulation detection are described to overcome these challenges and limitations by leveraging a variety of modalities to detect digital content that has been manipulated for misleading purposes. In an example, a computing device implements a detection system to receive digital content such as a digital video including one or more frames. The detection system is configured to calculate a manipulation score, e.g., based on one or more confidence scores, that indicates whether or not the digital content includes one or more deceitful manipulations. In some examples, the detection system is further operable to determine a type of manipulation, as well as indicate a spatial and/or temporal location of the manipulation as further described below.

For example, the detection system implements various detection strategies to calculate one or more confidence scores indicating the presence of a variety of misleading manipulation types. Consider an example in which a digital video with one or more frames includes several individuals. In this example, the detection system identifies coordinates of a given frame that correspond to a gaze location for one or more of the individuals, e.g., using a gaze tracking algorithm. The detection system is configured to determine whether the coordinates of the frame correspond to a location of an object and/or a portion of an object included in the frame. In various implementations, the detection system determines a location of an object by running an object detector in regions definable by gaze locations of the one or more individuals.

Based on the correspondence between the gaze location coordinates and a location of an object, the detection system is operable to generate a gaze confidence score, e.g., indicating the presence of a spatial manipulation. For instance, in an example in which multiple individuals are looking at a common location of the frame and no object is detected within the location, this suggests that a feature of the video has been removed for deceptive purposes. In an alternative or additional example, the detection system determines that the gaze locations for multiple individuals is directed away from a particular object, indicating an increased likelihood that the particular object has been added to the video. Thus, the gaze confidence score is indicative of the presence of "absent targets," e.g., features that have been removed from a video, as well as "out-of-context targets," e.g., features that have been added to a video.

The detection system is further implemented to calculate a visual artifact confidence score, e.g., that indicates the presence of one or more deceptive visual artifacts in a digital video. For instance, various manipulation types result in subtle artifacts that persist through post processing steps. Accordingly, the detection system is configured to detect such visual artifacts. To do so in one example, the detection system leverages a convolutional neural network to detect resolution inconsistencies. For instance, the detection system identifies resolution inconsistencies associated with affine warpings such as affine face warpings. Thus, in various examples, the visual artifact confidence score is indicative of deceptive manipulations that occur near a facial region of an individual included in a digital video as well as localized spatial attacks such as text replacement and/or color changes of features.

In some implementations, the detection system is configured to calculate a temporal confidence score that indicates the presence of one or more temporal manipulations. Temporal manipulations, for instance, include alterations such as speeding up or slowing down a video, changing audial features of the video, adding/dropping/swapping video frames, etc. To detect these manipulations in some implementations, the detection system tracks an optical flow between adjacent video frames. For instance, the detection system determines an average moving velocity between pairs of frames to calculate a gradient of the optical flow. In examples in which the video has had frames removed (e.g., to cause the video to speed up) and/or has had frames added (e.g., to cause the video to slow down) the gradient of the flow decreases or increases, respectively.

In some examples, the detection system calculates the temporal confidence score based in part or in whole on a comparison between audial features of the digital video and visual features of the digital video. For instance, the detection system compares visual features (e.g., mouth movement, expression, and/or gestures associated with one or more individuals) with audio content of the video. The detection system is operable to determine a correlation between such visual and audial features to determine the temporal confidence score, e.g., that indicates a likelihood of a temporal manipulation.

The detection system is further implemented to determine an affective state confidence score based on discrepancies in one or more affective states. In various examples, affective states pertain to perceived emotions of individuals depicted in the video. In some examples, an affective state is a quantified metric. In additional or alternative examples, the affective state includes a label describing a perceived emotion, e.g., "anxious," "joyful," "tired," "relaxed," etc. In various embodiments, disparities between affective states of individuals included in the video and/or disparities between an affective state and the context of the video correlate to the presence of one or more manipulations, e.g., added and/or removed visual features for purposes of deception.

Accordingly, the detection system is operable to determine respective affective states for individuals depicted in a digital video. To do so, the detection system leverages a machine learning model to detect features such as facial expressions, body postures, scene features, contextual data associated with the video, etc. The detection system is configured to determine discrepancies between affective states that indicate the presence of one or more manipulations.

For instance, discrepancies include disparities between the affective states of two or more individuals depicted in a video, e.g., a particular individual is "relaxed" while other individuals in the scene are "anxious." In this example, the disparity indicates that the relaxed individual has been added to the video, and/or facial features of the individual have been edited. In some examples, a discrepancy is based on contextual information associated with the video. By way of example, the detection system determines that an individual is dancing and has an affective state of "happy," however contextual information indicates that the individual is attending a funeral. Thus, this discrepancy indicates a likelihood of deceptive manipulation. In this way, the techniques described herein overcome limitation of conventional systems that do not consider an environmental context of a video for determining whether or not the video has been manipulated.

As noted above, the detection system is configured to generate a manipulation score based on one or more confidence scores. For instance, the manipulation score is based on one or more of the gaze confidence score, visual artifact confidence score, temporal confidence score, and/or the affective state confidence score. The detection system is operable to calculate the manipulation score in a variety of ways. For instance, the manipulation score is a maximum or two or more of the confidence scores. In some examples, the manipulation score is based on one or more confidence scores that exceed a threshold. Additionally or alternatively, the manipulation score represents an aggregation of multiple confidence scores. In other examples, generating the manipulation score includes applying a weighting to one or more of the confidence scores.

In various examples, if the manipulation score is above a threshold, the detection system determines that the digital video includes one or more manipulations. As noted above, in some examples the detection system determines a type of deceptive manipulation included in the video, as well as indicate a spatial and/or temporal location of the manipulation. For instance, a determination of the type and/or location of a manipulation is based on the one or more confidence scores. The detection system is further operable to configure an indication for display in a user interface of the computing device, e.g., indicating the presence, type, and/or location of a manipulation to the video. Accordingly, the techniques described herein enable detection of a wide range of manipulation types and further provide a diagnostic capacity that is not possible using conventional techniques.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102 connected to a network 104, which is configurable in a variety of ways. The computing device 102 is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in detail with respect to FIG. 10.

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a detection module 110. The storage device 108 is illustrated to include digital content 112 such as digital images, digital videos, graphic artwork, etc. The detection module 110 is illustrated as having, receiving, and/or transmitting digital video 114, e.g., a digital video 114 including one or more frames 116. In some implementations, the digital video is representative of a single frame, e.g., a digital image. In one or more examples, the digital video 114 depicts at least one entity, e.g., one or more individuals included in a scene. The detection module 110 is operable to determine if the digital video 114 has been manipulated in one or more ways which are likely deceptive.

For instance, in the illustrated example as shown in first stage 118 and second stage 120, the detection module 110 receives two digital videos 114 depicting a similar scene. As shown at first stage 118, a frame 116 of a first digital video 122 depicts three individuals sitting on a ridgeline, in which the two individuals on the right are looking at the individual on the left holding the cup. As shown in second stage 120, a frame 116 of a second digital video 124 similarly depicts the two individuals on the right, however the person holding the cup is not depicted in (e.g., has been removed from) the second digital video 124.

At first stage 118, the detection module 110 determines that the first digital video 122 has not been manipulated, for instance based on a manipulation score being below a threshold value. In this example, the manipulation score is based on one or more of a gaze confidence score, a visual artifact confidence score, a temporal confidence score, and/or an affective state confidence score. The detection module 110 is further configured to output an indication 126, for instance via a user interface 128 output by the display device 106. In first stage 118, the indication 126 includes the message that the "Video is authentic."

At second stage 120, the detection module 110 determines that the second digital video 124 has been manipulated, for instance based on a manipulation score being over a threshold value. In this example, the manipulation score is based on a gaze confidence score that indicates the presence of a spatial manipulation. For instance, the detection module 110 determines the gaze location of the individuals in the scene. In the illustrated example, the gaze location is represented by the white box at 130. The detection module 110 is further operable to determine that the scene does not include an object that corresponds to the gaze locations. The detection module 110 calculates the gaze confidence score based on the gaze location and the lack of an object at the gaze location. The manipulation score is based on the gaze confidence score, and thus the detection module determines that the video has been manipulated. The detection module 110 is further configured to generate an indication 126' in the user interface 128 of the display device 106, in this example the indication 126' includes the message that the "Video has been manipulated!" In this way, the techniques described herein enable detection of a wide variety of deceptive manipulations in digital videos containing complicated scene geometries and multiple individuals.

Video Manipulation Detection

Figure 2:
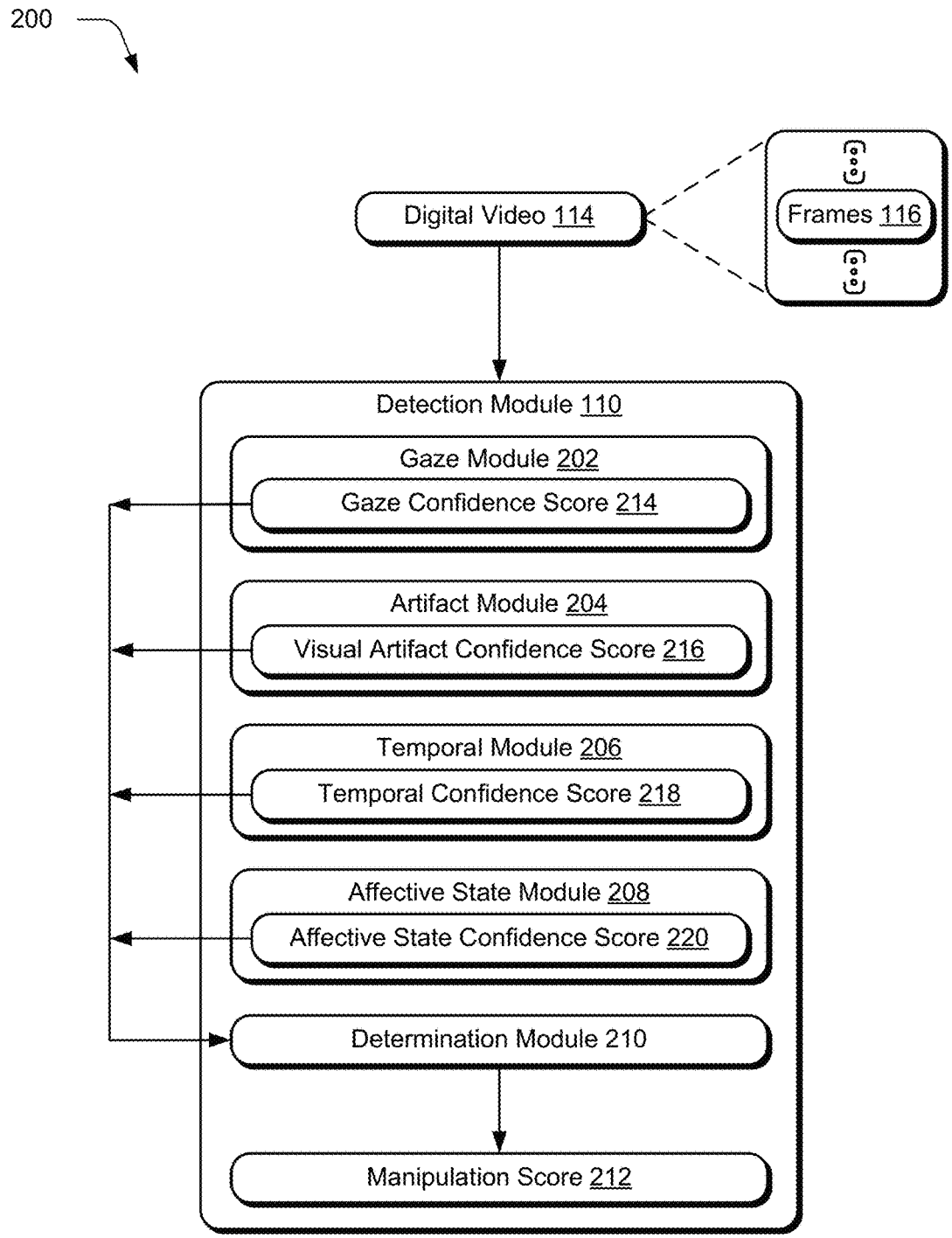
FIG. 2 depicts a system in an example implementation showing operation of the detection module of FIG. 1 in greater detail.

FIG. 2 depicts a system 200 in an example implementation showing operation of a detection module 110 in greater detail. The detection module 110 is illustrated to include a gaze module 202, an artifact module 204, a temporal module 206, an affective state module 208, and a determination module 210. In this example, the detection module 110 is implemented to receive a digital video 114 including one or more frames 116. In an example, the digital video 114 depicts at least one entity, e.g., one or more individuals. The detection module 110 is configured to calculate a manipulation score 212 indicating whether the video has been manipulated, e.g., based on one or more confidence scores such as a gaze confidence score 214, a visual artifact confidence score 216, a temporal confidence score 218, and/or an affective state confidence score 220. This is by way of example and not limitation, and incorporation of additional manipulation detection strategies is contemplated, e.g., to generate additional confidence scores to influence the manipulation score 212.

In an example, the gaze module 202 is employed to calculate a gaze confidence score 214. To do so, the gaze module 202 identifies coordinates for a particular frame of the frames 116 that correspond to a gaze location for one or more individuals depicted in the digital video 114. For example, identifying gaze location coordinates for a particular individual includes defining a bounding box around a head region of a particular individual. The gaze module 202 obtains spatial coordinates for the bounding box, as well as generates a cropped image patch of the head region defined by the bounding box. Using the bounding box coordinates and cropped image patch as inputs, the gaze module 202 employs a gaze tracking and/or gaze-following algorithm to determine a gaze location for the particular individual.

In various examples, the gaze location is represented as coordinates, e.g., as a region and/or a single point. In one or more implementations, the gaze tracking algorithm is a gaze tracking algorithm as described by Recasens, Adria et al. *Where Are They Looking?*, Advances in Neural Information Processing Systems 28, edited by C. Cortes et al., Curran Associates, Inc. 2015, pp. 199-207. In some examples, the gaze module 202 determines gaze locations for more than one entity depicted in the digital video 114. In such examples, the gaze module 202 is operable to generate one or more aggregate gaze locations, e.g., by averaging coordinates associated with gaze locations for the respective entities.

The gaze module 202 is further configured to determine whether the coordinates correspond to a location of an object and/or a portion of an object included in the particular frame of the frames 116. In various implementations, the gaze module 202 determines a location of an object in the digital video 114 by implementing an object detector, e.g., an object detection technique, in regions definable by gaze locations of the one or more individuals. A variety of object detection strategies are contemplated, e.g., using segmentation tools, user drawn or automatically generated bounding boxes, deep learning based object recognition strategies, etc.

The gaze module 202 is operable to calculate a gaze confidence score 214, e.g., based on a correspondence between the gaze location coordinates and the location of an object. In various examples, the gaze confidence score 214 indicates a probability that the digital video 114 includes one or more deceptive spatial manipulations such as an added visual feature inserted into the digital video and/or a removed visual feature removed from the digital video. In some examples, the gaze confidence score 214 is represented as one or more of a percentage, decimal, binary value, label, etc. In one example in which the digital video 114 includes a plurality of entities, the gaze module 202 is calculates the gaze confidence score 214 by comparing a plurality of gaze locations for each entity of the plurality of entities, one to another. For instance, the gaze module 202 compares the plurality of gaze locations to generate one or more aggregate gaze locations and determines whether the one or more aggregate gaze locations correspond to the location of an object. In additional or alternative implementations, calculation of the gaze confidence score 214 is based in part on one or more other confidence scores, e.g., the visual artifact confidence score 216, the temporal confidence score 218, and/or the affective state confidence score 220. An example of the functionality of the gaze module 202 is discussed below with respect to FIG. 3.

In one or more examples, the artifact module 204 is operable to calculate a visual artifact confidence score 216. In some implementations, the visual artifact confidence score 216 indicates the presence of one or more visual artifacts included in a digital video 114. In various examples, to calculate the visual artifact confidence score 216 the artifact module 204 leverages a convolutional neural network to detect resolution inconsistencies, e.g., resolution inconsistencies between portions of the digital video 114. In an example, the artifact module 204 identifies resolution inconsistencies associated with affine warpings such as affine face warpings. Thus, the artifact module 204 identifies resolution inconsistencies that occur between a warped facial area and a surrounding scene. In one or more implementations, the artifact module 204 leverages a convolutional neural network as described by Li, et al. *Exposing deepfake videos by detecting face warping artifacts*. In IEEE Conference on Computer Vision and Pattern Recognition Workshops (CVPRW), 2019. In various examples, the visual artifact confidence score 216 is indicative of manipulations performed near a facial region of an individual included in the digital video 114. Additionally or alternatively, in some examples the visual artifact confidence score 216 is indicative of localized spatial attacks such as text replacement and/or color changes of features. An example of the functionality of the artifact module 204 is discussed below with respect to FIG. 4.

The detection module 110 implements a temporal module 206 to calculate a temporal confidence score 218. In an example, the temporal confidence score 218 indicates the presence of one or more temporal manipulations. Temporal manipulations, for instance, include misleading alterations such as speeding up or slowing down the digital video 114, changing audial features of the digital video 114, adding/dropping/swapping one or more frames 116, etc. As part of calculating the temporal confidence score 218, in some implementations the temporal module 206 tracks an optical flow between adjacent video frames 116. For instance, the temporal module 206 determines an average moving velocity between pairs of adjacent video frames 116 to calculate a gradient of the optical flow. In examples in which the digital video 114 has had frames 116 removed (e.g., to speed up the digital video 114) and/or has had frames 116 added (e.g., to slow down the digital video 114) the gradient of the flow decreases or increases, respectively. In various implementations, the temporal module 206 leverages a convolutional neural network to track the optical flow. For instance, the temporal module 206 leverages a convolutional neural network as described by Dosovitskiy, et al. *Flownet: Learning optical flow with convolutional networks*. In Proceedings of the IEEE international conference on computer vision, pp. 2758-2766, 2015.

In some examples, the temporal module 206 is operable to calculate the temporal confidence score 218 based in part or in whole on a comparison between audial features of the digital video 114 and visual features of the digital video 114. For example, the temporal module 206 is configured to extract visual features associated with one or more individuals from the digital video 114, e.g., mouth movement, expression, and/or gestures associated with the one or more individuals. The temporal module 206 is further configured to extract audial features from the digital video 114. Thus, the temporal module 206 is operable to compare the visual features with the audial features, e.g., to identify discrepancies such as a mouth moving in a manner that is inconsistent with the detected audio. In this way, the techniques described herein enable detection of malicious manipulations of the digital video 114 over a sequence of frames 116. The temporal module 206 and its associated functionality are further illustrated and discussed below with respect to FIG. 5.

The affective state module 208 is employed in some examples to calculate the affective state confidence score 220. By way of example, the affective state confidence score 220 indicates discrepancies in one or more affective states of individuals depicted in the digital video 114. In various examples, affective states pertain to perceived emotions of individuals depicted in the digital video 114. In some examples, an affective state is a quantified metric. In additional or alternative examples, the affective state includes a label, e.g., an affective state label such as "anxious," "joyful," "tired," "relaxed," etc. In various embodiments, disparities between affective states of individuals included in the video and/or disparities between an affective state and the context of the video correlate to the presence of one or more manipulations.

Accordingly, the detection module 110 implements the affective state module 208 to determine respective affective states for individuals depicted in a digital video. In an example, the affective state module 208 leverages a machine learning model to detect features such as facial expressions, body postures, scene features, contextual data associated with the video, etc. By way of example, the affective state module 208 leverages a machine learning model as described by Mittal, et al. *Emoticon: Context-aware multimodal emotion recognition using Frege's principle.* 2020 IEEE/CVF Conference on Computer Vision and Pattern Recognition (CVPR), pp. 14222-14231, 2020. The affective state module 208 is further configured to determine discrepancies of affective states that indicate the presence of one or more deceptive manipulations.

For instance, discrepancies include disparities between the affective states of two or more individuals depicted in a digital video 114, e.g., an individual is "relaxed" while other individuals in the scene are "anxious." In an example, this disparity indicates that the relaxed individual has been added to the video, and/or facial features of the individual have been edited. Thus, the affective state module 208 is operable to calculate the affective state confidence score 220 by generating labels for multiple individuals depicted in a digital video 114, and comparing the respective labels, one to another.

In some examples, a discrepancy is based on contextual information associated with the digital video 114. By way of example, the detection module 110 determines that an individual is dancing and has an affective state of "happy," however contextual information indicates that the individual is attending a funeral. Thus, this discrepancy indicates a likelihood of manipulation. Accordingly, the affective state module 208 is operable to calculate the affective state confidence score 220 by comparing a label generated for a particular individual depicted in the digital video 114 to contextual information associated with the digital video 114. In this way, the techniques described herein overcome limitations of conventional techniques that do not consider an environmental context of a video to determine whether or not the video has been deceptively manipulated. An example implementation describing functionality of the affective state module 208 is further discussed below with respect to FIG. 6.

The detection module 110 implements a determination module 210 to generate the manipulation score 212 based on one or more confidence scores. For instance, the determination module 210 receives (e.g., as an input) one or more of the gaze confidence score 214, visual artifact confidence score 216, temporal confidence score 218, and/or the affective state confidence score 220. The determination module 210 is operable to calculate the manipulation score 212 in a variety of ways. In one example, the manipulation score 212 is a maximum or two or more of the confidence scores. In some examples, the manipulation score 212 is based on one or more confidence scores that exceed a threshold value. Additionally or alternatively, the manipulation score 212 represents an aggregation of multiple confidence scores. In other examples, generating the manipulation score 212 includes applying a weighting to one or more of the confidence scores.

In various examples, if the manipulation score 212 is above a threshold, the determination module 210 determines that the digital video 114 includes one or more manipulations. As noted above, in some examples the detection module 110 determines a type of manipulation included in the video, as well as indicate a spatial and/or temporal location of the manipulation. For instance, a determination of the type and/or location of a manipulation is based on values of the one or more confidence scores. The detection module 110 is further operable to configure an indication for display in the user interface 128 of the display device 106, e.g., indicating the presence, type, and/or location of a misleading manipulation included in the digital video 114. Accordingly, the techniques described herein enable detection of a wide range of manipulation types and further provide a diagnostic capacity that is not possible using conventional techniques that are constrained to detection of a single type of alteration.

Figure 3:
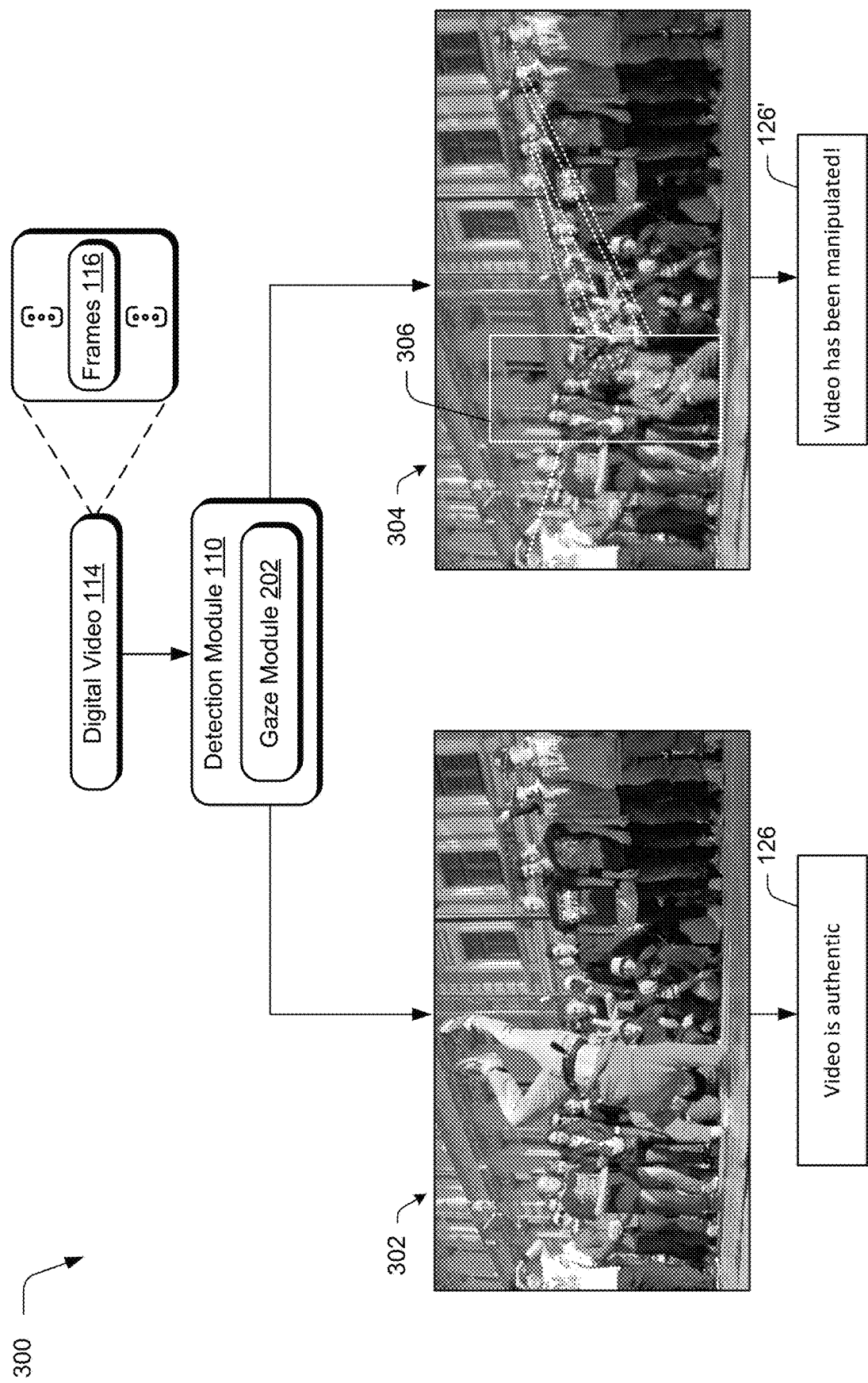
FIG. 3 depicts an example of video manipulation detection illustrating functionality of a gaze module.

FIG. 3 depicts an example 300 of video manipulation detection illustrating functionality of the gaze module 202 in first stage 302 and second stage 304. As illustrated, the detection module 110 is operable to receive a digital video 114 including one or more frames 116. As shown in first stage 302, the digital video 114 received by the detection module 110 depicts a person break-dancing as well as a crowd of people watching the person. In accordance with the techniques described above, the detection module 110 is employed to determine that the digital video 114 represented in first stage 302 is authentic, i.e., is not manipulated. For instance, the determination is based on a manipulation score 212 that is below than a threshold value. Accordingly, the detection module 110 generates an indication 126 including the message "Video is authentic," for instance for display in a user interface 128.

In second stage 304, the digital video 114 received by the detection module 110 is similar to the video in first stage 302, however, the digital video 114 has been manipulated to remove the person break-dancing in second stage 304. In accordance with the techniques described above, the detection module 110 employs a gaze module 202 to calculate a gaze confidence score 214, e.g., that indicates whether or not the digital video has been deceptively manipulated. In this example, the gaze module 202 is operable to determine coordinates of a frame 116 of the digital video 114 that correspond to gaze locations for multiple individuals, e.g., people in the crowd.

Continuing the above example, the gaze locations correspond to an area where the person dancing "should appear" but doesn't, represented at 306 as a white box. Accordingly, the gaze module 202 is configured to detect this discrepancy, and the gaze confidence score 214 indicates the presence of one or more spatial manipulations. Thus, the manipulation score 212 is based at least in part on the gaze confidence score 214, and indicates that the digital video 114 has been manipulated. Accordingly, the detection module 110 is generates an indication 126' including the message "Video has been manipulated!" for instance for display in the user interface 128.

Figure 4:
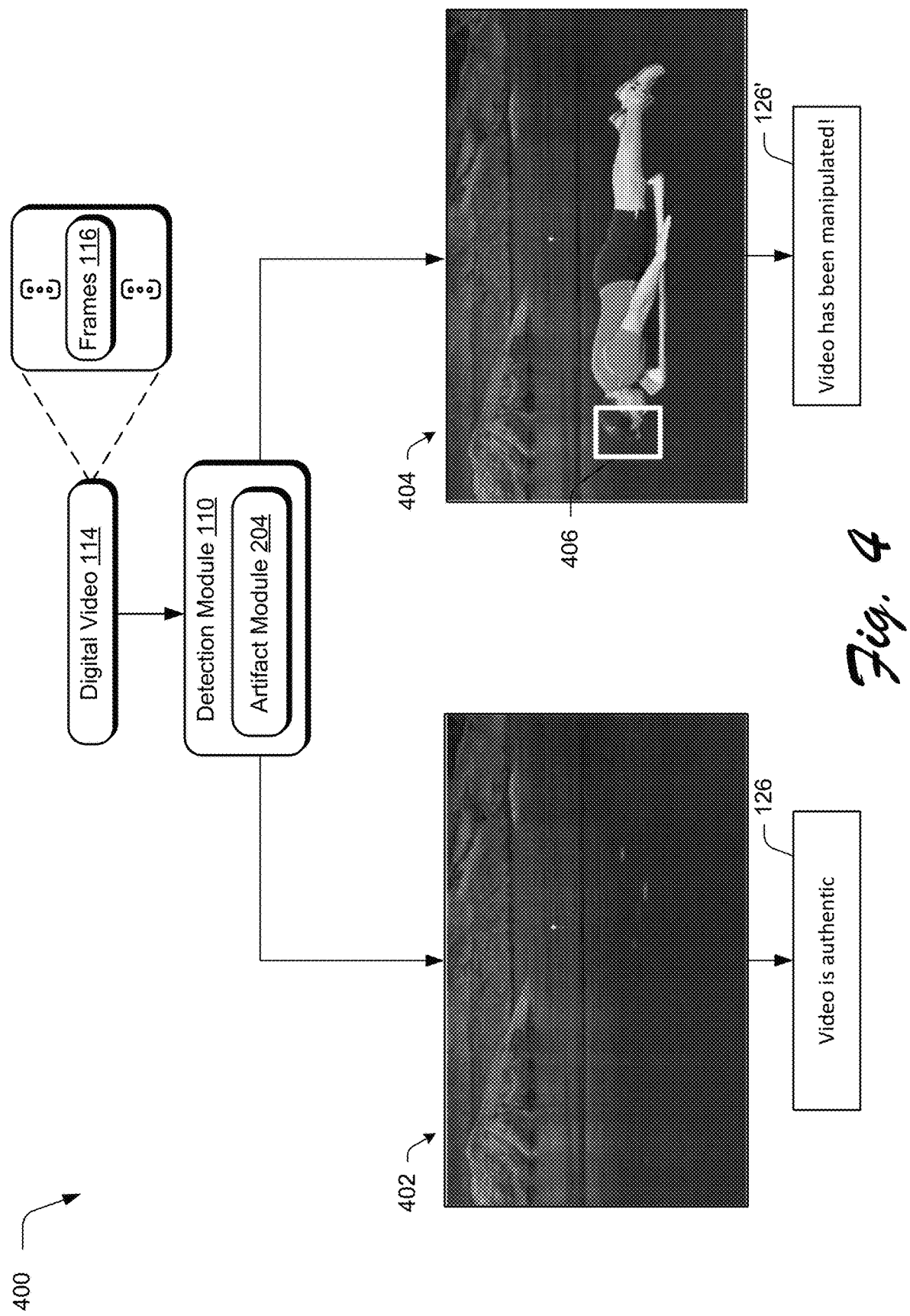
FIG. 4 depicts an example of video manipulation detection illustrating functionality of an artifact module.

FIG. 4 depicts an example 400 of video manipulation detection illustrating functionality of the artifact module 204 in first stage 402 and second stage 404. In this example, the detection module 110 is operable to receive a digital video 114 including one or more frames 116. As shown in first stage 402, the digital video 114 received by the detection module 110 depicts a surface of a lake with shoreline in the background. In accordance with the techniques described above, the detection module 110 is employed to determine that the digital video 114 represented in first stage 402 is authentic, i.e., is not manipulated. Accordingly, the detection module 110 generates an indication 126 including the message "Video is authentic," e.g., for display in the user interface 128.

In second stage 404, the digital video 114 received by the detection module 110 is similar to the video in first stage 402, however, the digital video 114 has been manipulated to include a person laying face-down on top of a platform floating on the surface of the lake in second stage 404. In accordance with the techniques described above, the detection module 110 employs the artifact module 204 to calculate a visual artifact confidence score 216, e.g., by leveraging a convolutional neural network to detect resolutions inconsistencies. In this example, the artifact module 204 is operable to determine resolution inconsistencies associated with a facial region 406 of the person. For instance, resolution inconsistencies between the facial region 406 and the surrounding scene near the facial region 406. The visual artifact confidence score 216 indicates the presence of such resolution inconsistencies. Thus, the manipulation score 212 is based at least in part on the visual artifact confidence score 216 and indicates that the digital video 114 has been deceptively manipulated. Accordingly, the detection module 110 generates an indication 126' including the message "Video has been manipulated!" for instance for display in the user interface 128.

Figure 5:
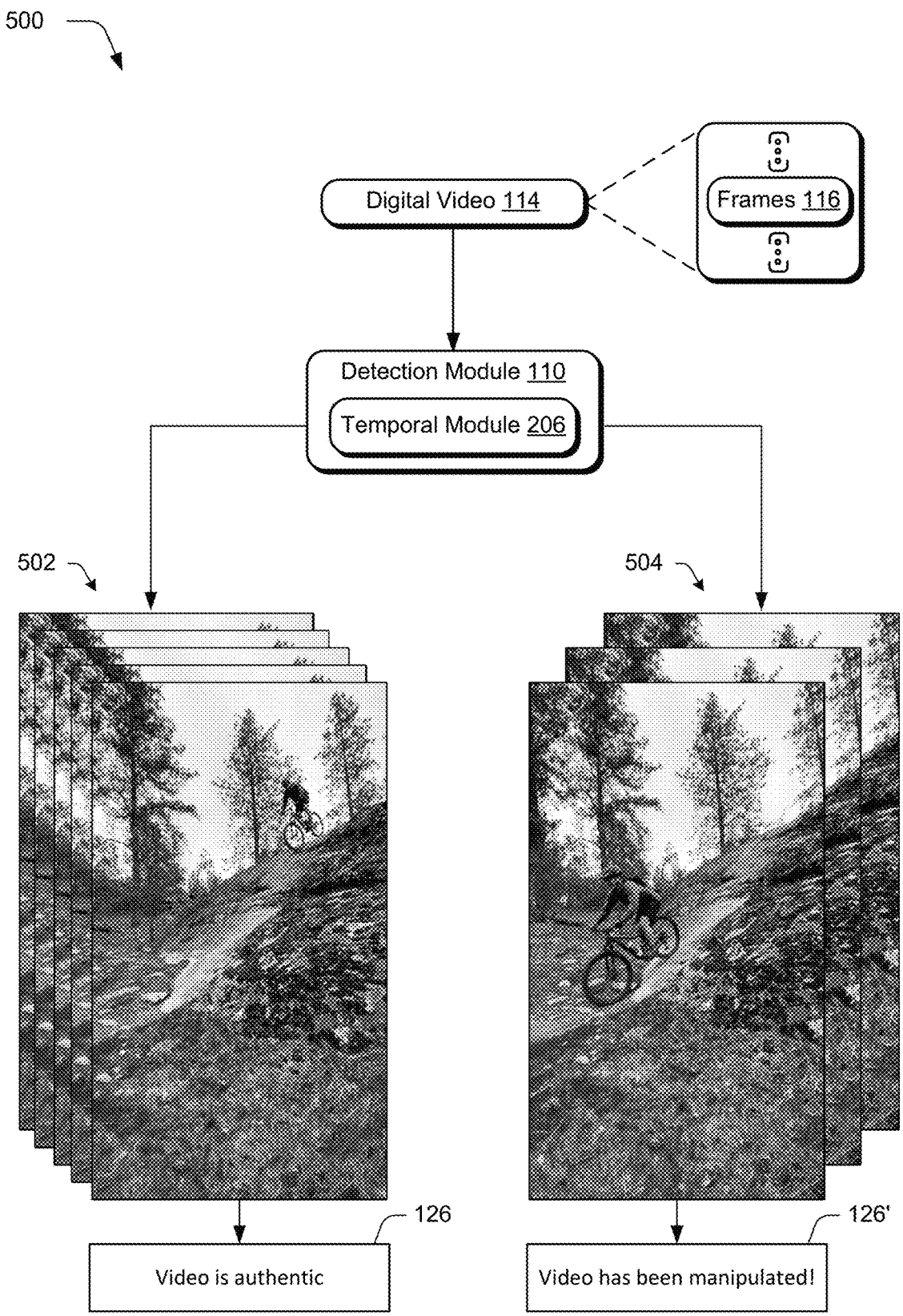
FIG. 5 depicts an example of video manipulation detection illustrating functionality of a temporal module.

FIG. 5 depicts an example 500 of video manipulation detection illustrating functionality of the temporal module 206 in first stage 502 and second stage 504. In this example, the detection module 110 is operable to receive a digital video 114 including multiple frames 116. As shown in first stage 502, the digital video 114 received by the detection module 110 depicts a biker on the top of a hill. In accordance with the techniques described above, the detection module 110 is employed to determine that the digital video 114 represented in first stage 502 is authentic, i.e., is not manipulated. Accordingly, the detection module 110 is generates an indication 126 including the message "Video is authentic," e.g., for display in a user interface 128.

In second stage 504, the digital video 114 received by the detection module 110 is similar to the video in first stage 502, however, the digital video 114 has been manipulated to remove several of the frames, e.g., to "speed up" the digital video 114 in second stage 504. For instance, the biker appears towards the bottom of the hill as compared to first stage 502 in which the biker is positioned towards the top of the hill. In accordance with the techniques described above, the detection module 110 employs the temporal module 206 to calculate a temporal confidence score 218, e.g., by determining an optical flow between adjacent frames of the digital video 114.

In this example, the temporal module 206 is employed to detect changes in a gradient of the optical flow between consecutive frames 116, e.g., as described above. In this way, the temporal module 206 is operable to generate a temporal confidence score 218 which indicates that several frames 116 have been removed from the digital video 114. The manipulation score 212 is based at least in part on the temporal confidence score 218, and thus indicates that the digital video 114 has been manipulated in a deceptive manner. Accordingly, the detection module 110 is generates an indication 126' including the message "Video has been manipulated!" for instance for display in the user interface 128.

Figure 6:
FIG. 6 depicts an example of video manipulation detection illustrating functionality of an affective state module.

FIG. 6 depicts an example 600 of video manipulation detection illustrating functionality of the affective state module 208 in first stage 602 and second stage 604. In this example, the detection module 110 is operable to receive a digital video 114 including multiple frames 116. As shown in first stage 602, the digital video 114 received by the detection module 110 depicts a group of people exercising or working out, for instance individuals 606-616 are depicted as wearing workout clothes and lifting/pulling various weights. In accordance with the techniques described above, the detection module 110 is operable to determine that the digital video 114 represented in first stage 602 is authentic, i.e., is not manipulated. Accordingly, the detection module 110 is generates an indication 126 including the message "Video is authentic," e.g., for display in the user interface 128.

In second stage 604, the digital video 114 received by the detection module 110 is similar to the video in first stage 602, however, the digital video 114 has been manipulated to insert individual 618 within the digital video 114 in second stage 604. For example, unlike the individuals 606-616 that are depicted as wearing workout clothes and lifting/pulling various weights, the individual 618 is depicted as wearing professional clothes and having open, unclenched hands. In accordance with the techniques described above, the detection module 110 employs the affective state module 208 to calculate an affective state confidence score 220, for instance by leveraging a machine learning model to detect discrepancies in affective states, e.g., perceived emotion. In an example, the affective state module 208 is employed to determine respective affective states for the individuals 606-618 depicted in the digital video 114, e.g., based on facial features, body posture, contextual data, etc.

In this example, the affective state module 208 generates labels for the individuals 606-616 which indicate that the individuals 606-616 are "focused." On the other hand, the individual 618 has a label which indicates that the individual 618 is "surprised." The affective state module 208 is further configured to detect a scene context such as that the scene includes a gym setting in an example. Accordingly, in this example the affective state module 208 detects disparities between the affective states of the individual 618 and the individuals 606-616, as well as discrepancies between the affective states of the individual 618 and the scene context. In this way, the affective state module 208 is operable to generate the affective state confidence score 220 that indicates that the individual at 618 has been added to the digital video 114. The manipulation score 212 is based at least in part on the affective state confidence score 220, and thus indicates that the digital video 114 has been manipulated. Accordingly, the detection module 110 generates an indication 126' including the message "Video has been manipulated!" for instance for display in the user interface 128.

Figure 7:
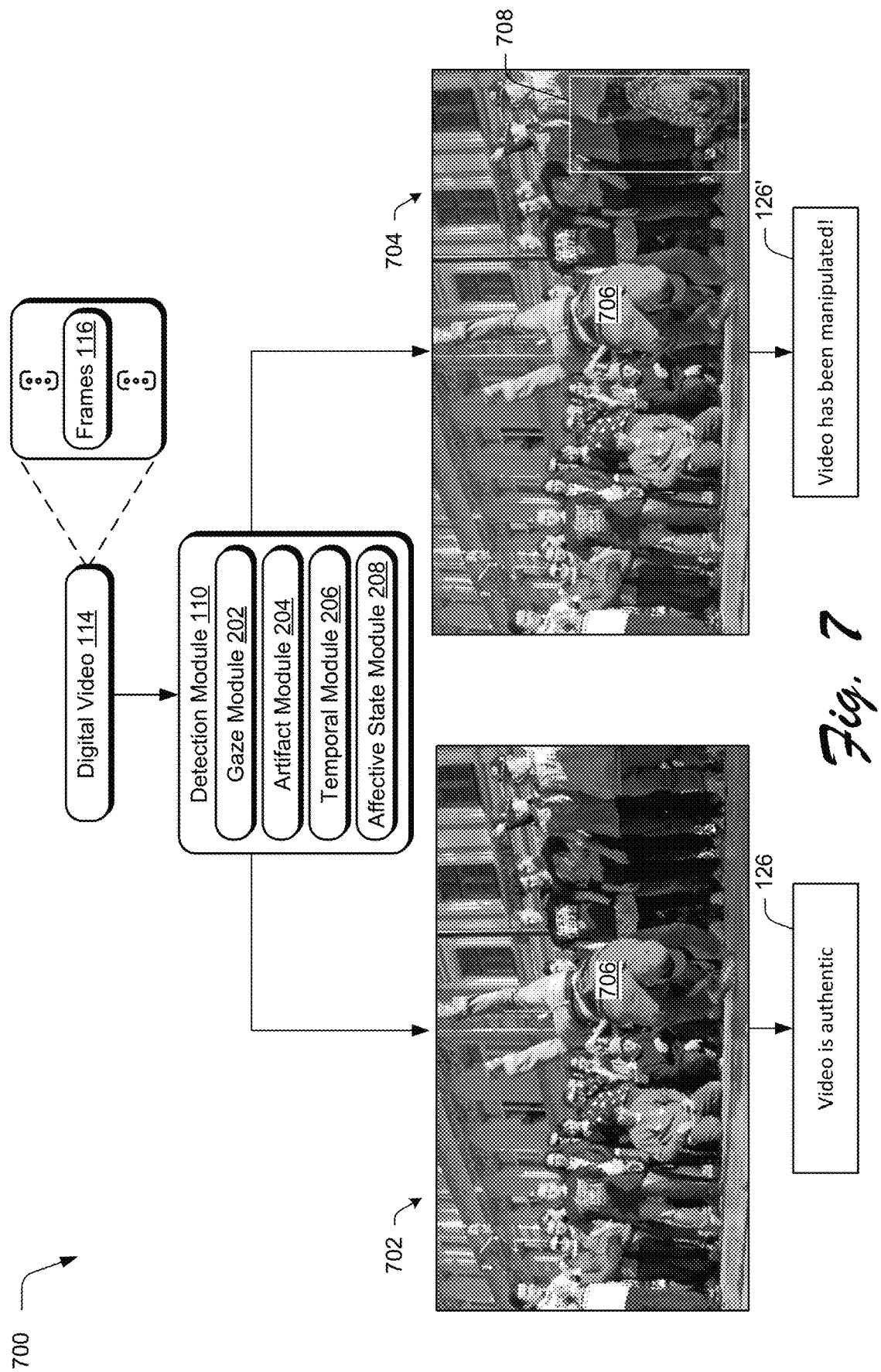
FIG. 7 depicts an example of video manipulation detection utilizing various detection strategies.

FIG. 7 depicts an example 700 of video manipulation detection utilizing various detection strategies in first stage 702 and second stage 704. As noted above, in various examples the manipulation score 212 is based on one or more confidence scores. In the illustrated example, the detection module 110 is operable to receive a digital video 114 including multiple frames 116. As shown in first stage 702, the digital video 114 received by the detection module 110 depicts a crowd of people watching a person 706 that is break dancing. In accordance with the techniques described above, the detection module 110 determines that the digital video 114 represented in first stage 702 is not manipulated, e.g., based on a manipulation score 212 being below a threshold value. Accordingly, the detection module 110 is operable to generate an indication 126 including the message "Video is authentic."

In second stage 704, the digital video 114 received by the detection module 110 has been manipulated to insert an individual 708 within the digital video 114, e.g., the individual 708 is a soldier. In accordance with the techniques described above, the detection module 110 employs the gaze module 202 to calculate a gaze confidence score 214, in this example represented as $c_g$. Similarly, the artifact module 204 is employed to calculate a visual artifact confidence score 216 represented as $c_v$, the temporal module 206 is employed to calculate a temporal confidence score 218 represented as $c_t$, and the affective state module 208 is employed to calculate an affective state confidence score 220 represented in this example as $c_a$.

In an example, the gaze confidence score 214, the visual artifact confidence score 216, and the affective state confidence score 220 are suggestive of the presence of a manipulation while the temporal confidence score 218 is not indicative of a temporal manipulation. For instance, the gaze of the crowd is towards the person 706 and away from the individual/soldier 708, the artifact module 204 detects resolution inconsistencies associated with the individual/soldier's 708 face, and there are discrepancies between affective states of the crowd, e.g., "excited," and the individual/soldier 708, e.g., "stern."

The determination module 210 is operable to generate the manipulation score 212 based on one or more of the confidence scores in a variety of ways. In some examples, the manipulation score 212 is based on one or more confidence scores that exceed a threshold value. Additionally or alternatively, the manipulation score 212 represents an aggregation of multiple confidence scores. In other examples, generating the manipulation score 212 includes applying a weighting to one or more of the confidence scores. In various implementations, the manipulation score 212 is generated by leveraging a relationship between confidence scores.

In the illustrated example, the manipulation score 212 is a maximum of the gaze confidence score 214, visual artifact confidence score 216, temporal confidence score 218, and the affective state confidence score 220. For instance, the determination module 210 determines a manipulation is present where $\max(c_g, c_v, c_t, c_a) > \tau$ in which $\tau$ represents a threshold value. In one example, the manipulation score 212 is greater than the threshold value $\tau$, and thus the determination module 210 determines that a manipulation is present in the digital video 114. Accordingly, the detection module 110 generates an indication 126' including the message "Video has been manipulated!" for instance for display in the user interface 128. Thus, the techniques as described herein support enhanced identification of manipulations by leveraging a variety of detection modalities and thus overcome the limitations of conventional systems.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7.

Figure 8:
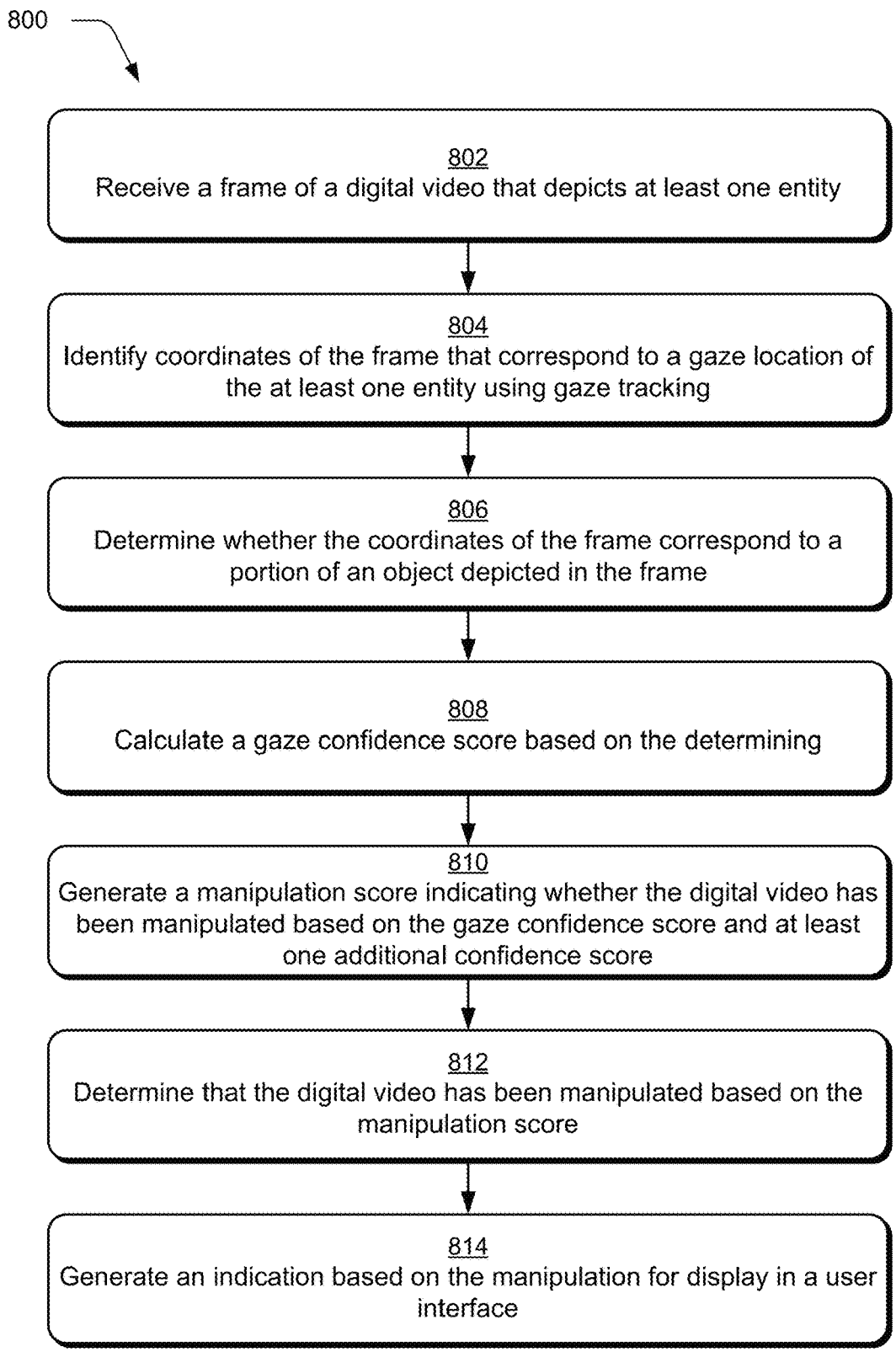
FIG. 8 depicts a procedure in an example implementation in which a frame of a digital video is received and a manipulation score is generated that indicates whether the digital video has been manipulated.

FIG. 8 depicts a procedure 800 in an example implementation in which a frame of a digital video is received and a manipulation score is generated that indicates whether the digital video has been manipulated. At 802, a frame of a digital video is received that depicts at least one entity. For instance, a frame 116 depicts a scene and one or more individuals. In one example, the computing device 102 implements the detection module 110 to receive the frame 116. At 804, coordinates of the frame that correspond to a gaze location of the at least one entity using gaze tracking are identified. In an example, a gaze module 202 is configured to define a bounding box around a head region of the entity. The gaze module 202 obtains spatial coordinates for the bounding box, and then generates a cropped image patch of the head region defined by the bounding box. Using the bounding box coordinates and cropped image patch as inputs, the gaze module 202 employs a gaze tracking algorithm to determine the coordinates that correspond to a gaze location of the at least one entity.

At 806, it is determined whether the coordinates of the frame correspond to a portion of an object depicted in the frame. For instance, the gaze module 202 is operable to leverage an object detector, e.g., an object detection algorithm, in regions definable by gaze locations of the at least one entity. A variety of object detection strategies are contemplated, e.g., using segmentation or masking tools, user drawn or automatically generated bounding boxes, deep learning based object recognition strategies, etc. At 808, a gaze confidence score is calculated based on the determining. For instance, the gaze confidence score indicates a likelihood of the presence of a spatial manipulation such as features that have been removed from a frame 116, features that have been added to a frame 116, features that have been moved within the frame 116, and so forth.

At 810, a manipulation score is generated indicating whether the digital video has been manipulated based on the gaze confidence score and at least one additional confidence score. For instance, a manipulation score 212 is based on one or more of the gaze confidence score 214, a visual artifact confidence score 216, temporal confidence score 218, and/or an affective state confidence score 220 as further discussed above and below. In an example, the detection module 110 is operable to calculate the manipulation score 212 in a variety of ways. In one or more examples, the manipulation score 212 is a maximum or two or more of the confidence scores. In some examples, the manipulation score 212 is based on one or more confidence scores that exceed a threshold. Additionally or alternatively, the manipulation score 212 represents an aggregation of multiple confidence scores. In other examples, generating the manipulation score 212 includes applying a weighting to one or more of the confidence scores.

At 812, it is determined that the digital video has been manipulated based on the manipulation score. For instance, the determination is based on the manipulation score 212 being greater than a threshold value. At 814, an indication is generated based on the manipulation for display in a user interface. In one or more examples, the indication 126 includes information about the manipulation. For instance, the indication 126 describes the presence of a manipulation. In another example, the indication describes the type of manipulation, e.g., object added to scene, scene sped up, audio changed, etc. Alternatively or additionally, the indication describes a spatial location and/or temporal location of the manipulation, e.g., where and/or when the manipulation occurs. Thus, the techniques described herein provide diagnostic functionality that enables a user to efficiently identify how a digital video 114 has been manipulated.

Figure 9:
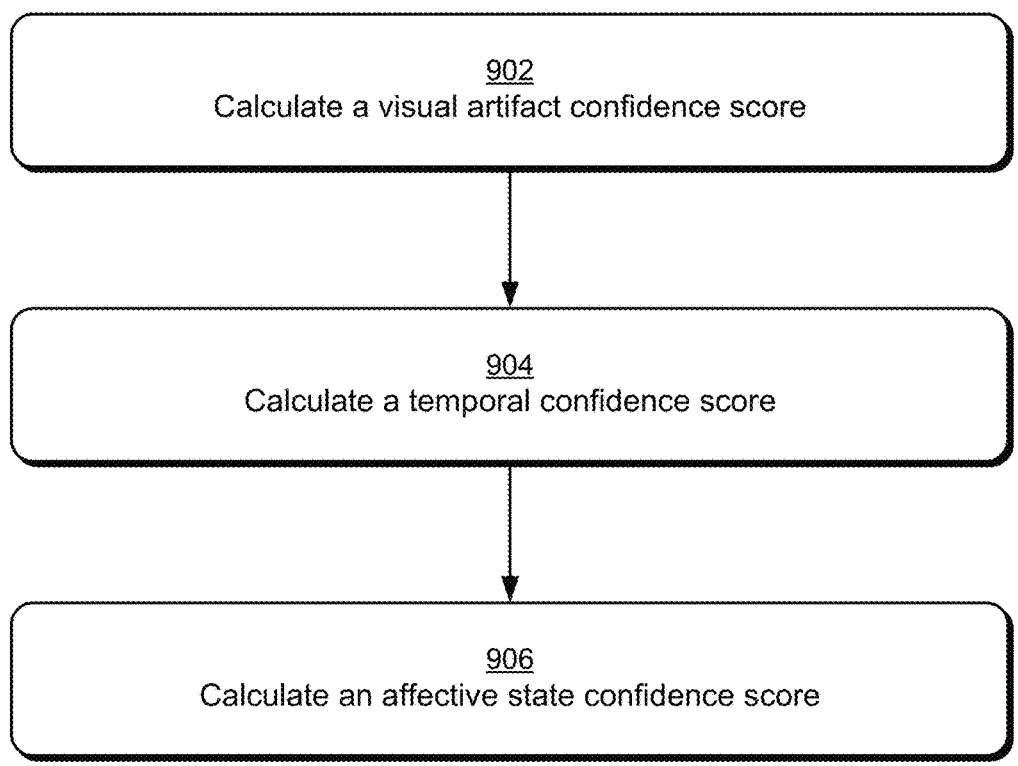
FIG. 9 depicts a procedure in an example implementation of video manipulation detection including calculating additional confidence scores.

FIG. 9 depicts a procedure 900 in an example implementation of video manipulation detection including calculating additional confidence scores. For instance, the procedure 900 is implemented as part of step 810 of FIG. 8, e.g., as part of generating a manipulation score. For instance, at 902, a visual artifact score is calculated. In some examples, the visual artifact confidence score 216 is calculated by leveraging a convolutional neural network to detect resolution inconsistencies. For instance, an artifact module 204 identifies resolution inconsistencies associated with affine warpings such as affine face warpings.

At 904, a temporal confidence score is calculated. In an example, the digital video 114 includes a plurality of frames 116. A temporal module 206 calculates the temporal confidence score 218 by determining an optical flow between adjacent frames 116 of the plurality of frames 116 of the digital video 114. Additionally or alternatively, the temporal module 206 is operable to calculate the temporal confidence score 218 based in part or in whole on a comparison between audial features of the digital video 114 and visual features of the digital video 114.

At 906, an affective state confidence score is calculated. In an example, the affective state confidence score 220 indicates discrepancies in one or more affective states of individuals depicted in the digital video 114. In various embodiments, disparities between affective states of individuals included in the video and/or disparities between an affective state and the context of the video correlate to the presence of one or more deceptive manipulations. As described above, the manipulation score 212 is based on one or more confidence scores. Thus, a variety of different detection modalities contribute to the manipulation score 212, providing a holistic manipulation detection system that is operable to detect manipulations in digital content with complicated scene geometries and multiple individuals.

Example System and Device

Figure 10:
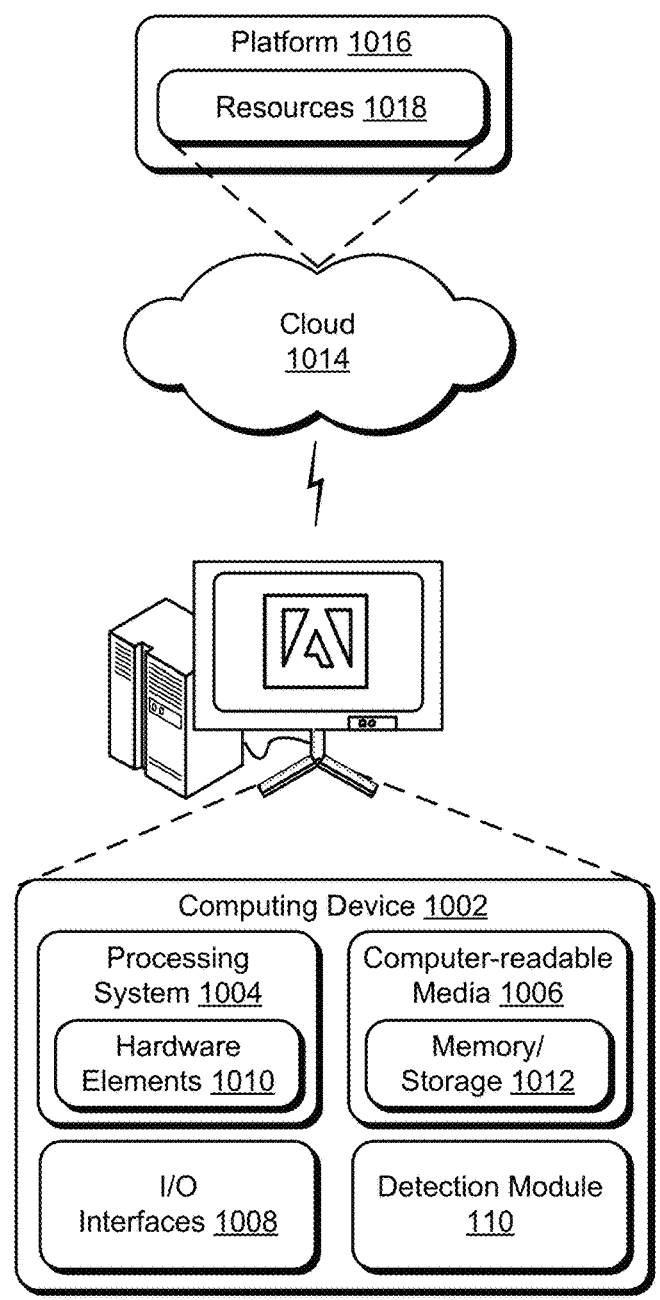
FIG. 10 illustrates an example system generally at that includes an example computing device that is representative of one or more computing systems and/or devices that implement the various techniques described herein.

FIG. 10 illustrates an example system 1000 that includes an example computing device 1002 that is representative of one or more computing systems and/or devices that implement the various techniques described herein. This is illustrated through inclusion of the detection module 110. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to the computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supported by various configurations of the computing device 1002 and are not limited to the specific examples of the techniques described herein. This functionality is also implementable all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

CONCLUSION

Although systems and techniques for video manipulation detection have been described in language specific to structural features and/or methodological acts, it is to be understood that the systems and techniques for video manipulation detection as defined in the appended claims is not necessarily limited to the specific features or acts described. Rather, the specific features and acts are disclosed as example forms of implementing the claimed systems and techniques for video manipulation detection.

What is claimed is:

1. A method comprising:
receiving, in a user interface of a processing device, a frame of a digital video that depicts an entity within a scene;
identifying, by the processing device, coordinates of the frame that correspond to a gaze location within the scene of the entity included in the scene using a gaze tracking algorithm;
determining, by the processing device, whether the coordinates correspond to a location of an object depicted in the scene;
calculating, by the processing device, a gaze confidence score that indicates a probability that the scene includes an added or removed visual feature based on the determining;
generating, by the processing device, a manipulation score that indicates whether the digital video has been manipulated based on the gaze confidence score and at least one additional confidence score; and
outputting, by the processing device, the manipulation score in the user interface.

2. The method as described in claim 1, further comprising:
determining that the digital video has been manipulated based on the manipulation score; and
generating an indication of a spatial location of a manipulation in the digital video for display in the user interface.

3. The method as described in claim 1, wherein the at least one additional confidence score includes a visual artifact confidence score calculated by leveraging a convolutional neural network to detect resolution inconsistencies associated with affine warpings.

4. The method as described in claim 1, wherein the at least one additional confidence score includes a temporal confidence score calculated by determining an optical flow between adjacent frames of a plurality of frames of the digital video.

5. The method as described in claim 4, wherein the temporal confidence score is calculated by comparing audial features of the digital video to visual features of the digital video.

6. The method as described in claim 1, wherein the at least one additional confidence score includes an affective state confidence score calculated by leveraging a machine learning model to detect discrepancies in affective states for the entity.

7. The method as described in claim 6, wherein the affective states are partially based on facial expressions of the entity, body postures of the entity, or contextual data associated with the digital video.

8. The method as described in claim 1, wherein the manipulation score is a maximum of the gaze confidence score and the at least one additional confidence score.

9. The method as described in claim 1, wherein generating the manipulation score includes applying a weighting to at least one of the gaze confidence score, a visual artifact confidence score, a temporal confidence score, or an affective state confidence score.

10. A system comprising:
a memory component; and
a processing device coupled to the memory component, the processing device configured to perform operations including:
receiving, in a user interface of the processing device, a frame of a digital video that depicts an individual within a scene;
identifying coordinates of the frame that correspond to a gaze location within the scene of the individual using a gaze tracking algorithm;
determining whether the coordinates correspond to a portion of an object depicted in the scene;
calculating a gaze confidence score based on the determining that indicates a probability that the scene includes one or more manipulated digital objects; and
generating a manipulation score for output in the user interface that indicates whether the digital video has been manipulated based on the gaze confidence score and one or more of a visual artifact confidence score, a temporal confidence score, or an affective state confidence score.

11. The system as described in claim 10, the operations further including:
determining that the digital video is manipulated based on the manipulation score being greater than a threshold; and
generating an indication of a type of manipulation present in the digital video for display in the user interface.

12. The system as described in claim 10, wherein the visual artifact confidence score is calculated by leveraging a convolutional neural network to detect resolution inconsistencies associated with affine warpings.

13. The system as described in claim 10, wherein the temporal confidence score is calculated by determining an optical flow between adjacent frames of a plurality of frames of the digital video.

14. The system as described in claim 10, wherein the temporal confidence score is calculated by comparing audial features of the digital video to visual features of the digital video.

15. The system as described in claim 10, wherein the digital video includes a plurality of individuals and wherein the affective state confidence score is calculated by leveraging a machine learning model to generate labels for each individual of the plurality of individuals, and comparing the labels, one to another.

16. The system as described in claim 10, wherein the manipulation score is a maximum of the gaze confidence score and the one or more of the visual artifact confidence score, the temporal confidence score, or the affective state confidence score.

17. A non-transitory computer-readable storage medium storing executable instructions, which when executed by a processing device, cause the processing device to perform operations comprising:
receiving, in a user interface of the processing device, a frame of a digital video that depicts an entity within a scene;
identifying gaze location coordinates of the scene that correspond to a gaze location of the entity included in the scene using a gaze tracking algorithm;
calculating a gaze confidence score based on whether the gaze location coordinates correspond to a portion of an object depicted in the scene, the gaze confidence score indicating a probability that the digital video includes one or more manipulated digital objects within the scene; and
presenting a manipulation score that indicates whether the digital video has been manipulated based on the gaze confidence score and at least one additional confidence score.

18. The non-transitory computer-readable storage medium as described in claim 17, wherein the manipulation score is based on an aggregation of the gaze confidence score and at least one of a visual artifact confidence score, a temporal confidence score, or an affective state confidence score.

19. The non-transitory computer-readable storage medium as described in claim 17, wherein the frame depicts a plurality of entities within the scene, and wherein calculating the gaze confidence score includes comparing a plurality of gaze locations within the scene for each entity of the plurality of entities, one to another.

20. The non-transitory computer-readable storage medium as described in claim 17, wherein the one or more manipulated digital objects include one or more of an object added to the scene or an object that has been removed from the scene.

* * * * *